INVENTOR.
CONRAD H. BENOIT
BY KENWAY, JENNEY, WITTER & HILDRETH
ATTORNEYS

United States Patent Office 3,016,273
Patented Jan. 9, 1962

3,016,273
PIVOT-TYPE SELF-ALIGNING HYDROSTATIC
BEARING ASSEMBLY
Conrad H. Benoit, Dedham, Mass., assignor to Northrop Corporation, Beverly Hills, Calif., a corporation of California
Filed June 29, 1960, Ser. No. 39,605
4 Claims. (Cl. 308—72)

This invention relates to a self-aligning bearing assembly of the type having spaced bearings, one of which is mounted on a pivot hanger to accommodate axial thermal growth or misalignment of a shaft supported by the bearings; and more particularly relates to an improved assembly of this kind which embodies hydrostatic bearing means. The assembly accommodates lateral deflection or misalignment of the shaft by self-aligning canting movement of the pivot hanger and the spaced bearings relative to the axis of the shaft.

It is the primary object of this invention to provide an improved bearing assembly of this kind which exhibits reduced frictional characteristics in the self-aligning action of both the shaft bearings and the pivot hanger, and thereby affords more precise alignment.

Briefly stated, I may carry out the invention in a preferred embodiment thereof by providing a pair of ball and socket hydrostatic bearings spaced apart on a shaft to be supported thereby, the balls of each of the bearings being secured to the shaft, and mounting the socket of one of the bearings upon a bearing support member which is supported upon a third hydrostatic bearing for rotation about an axis transverse to, and laterally spaced from the shaft axis. The bearing support member thus forms a pivot hanger for the shaft. The assembly supports the shaft for free rotation and universal angular movement in the ball and socket bearings. The third hydrostatic bearing adapts the assembly to automatically compensate for thermal axial growth of the shaft, and for axial shrinkage caused by lateral distortion of the shaft, by canting of the pivot hanger about the bearing.

Further objects and advantages of the invention will become apparent as the following description proceeds, referring to the accompanying drawing, in which.

Figures 1, 2, 3:
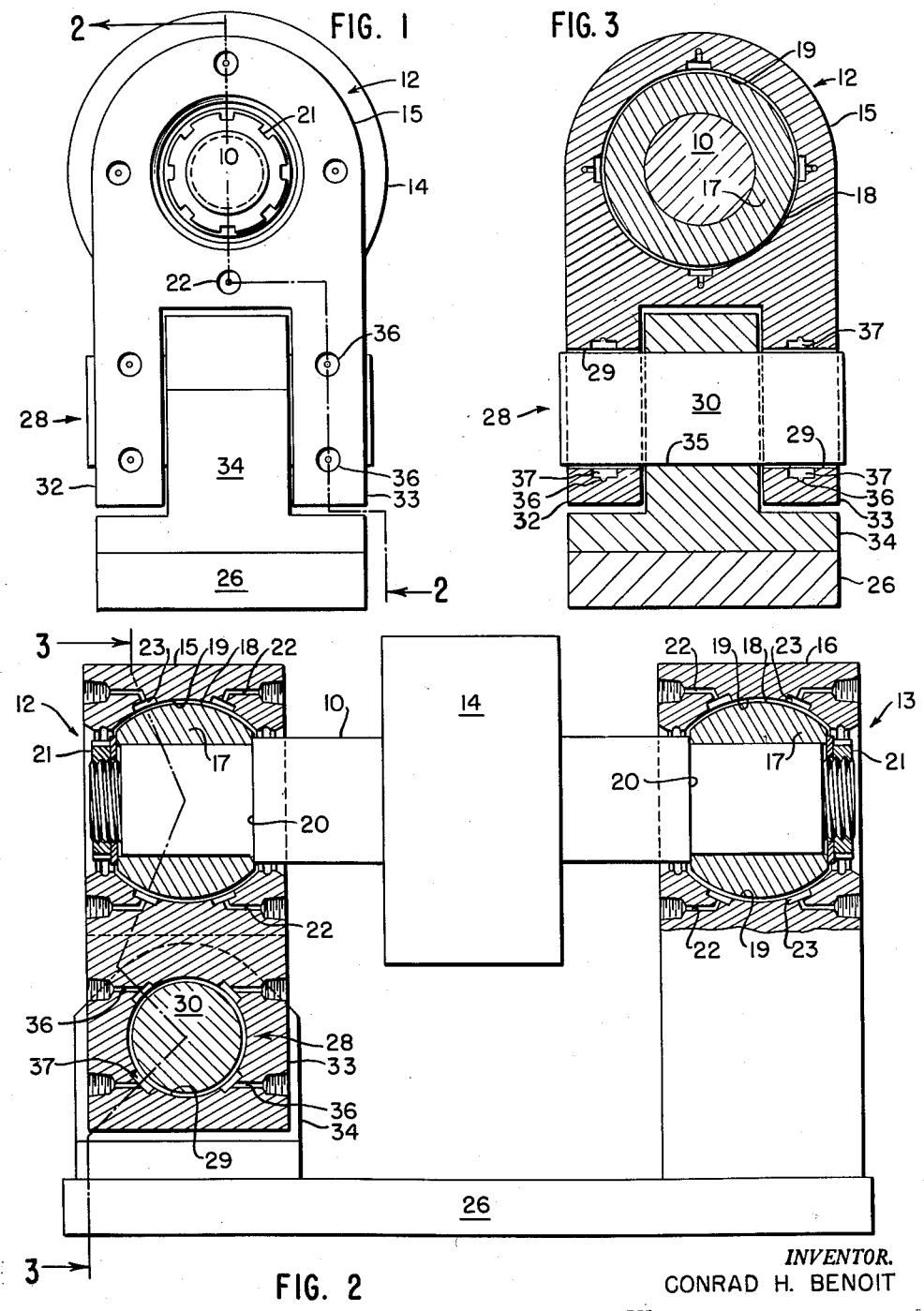
FIG. 1 is a view in side elevation of a bearing assembly according to a preferred embodiment of the invention.
FIG. 2 is a sectional view of the bearing assembly, taken along line 2—2 in FIG. 1, looking in the direction of the arrows.
FIG. 3 is a sectional view of the bearing assembly, taken along line 3—3 in FIG. 2, looking in the direction of the arrows.

In FIGS. 1–3 I have illustrated an embodiment of the invention which includes a shaft 10 rotatably supported in first and second spaced hydrostatic bearings 12 and 13. A typical load-carrying unit is shown at 14, supported on the shaft between the bearings. Both of the first and second bearings are of the ball and socket type permitting universal angular movement of the shaft in the bearing support members 15 and 16, respectively.

Each of the bearings 12 and 13 is identical, except for the form of the support members, and functions as a thrust-bearing supporting the shaft against axial movement relative thereto. These bearings each comprise an annular ball member 17 having an external spherical surface 18 in minutely spaced relation from a like internal spherical surface 19 formed in the supporting member. The bearing members are fixed to the shaft 10, by and between the shoulders 20 formed on the shaft, by means of nuts 21 threaded on the ends of the shaft. The first and second bearings thus comprise ball and socket joints supporting the shaft for free rotation and universal angular movement, but restraining axial movement of the shaft relative thereto.

I further provide means for supporting the shaft and the ball members on films of oil maintained by controlled pressures and flow rates within the clearances of the bearings above described, thus effectively floating the shaft on oil with no metal to metal contact with the bearings. These means include ports or passageways 22, as shown in FIG. 2, which are spaced circumferentially about surfaces 19 at 90° intervals, and disposed in pairs equally spaced axially on opposite sides of planes normal to the shaft and passing centrally through the bearings. Thus, there are eight ports 22 in each of the bearings 12 and 13. Each port terminates in an enlarged pocket recess 23 at the internal spherical surface of the support. Oil is forced through each of ports 22 under controlled pressure, and/or at a metered rate of flow, to the spherical surface through a suitable circulatory system such as is more fully shown and described in U.S. patent application Serial No. 778,420 to Calvin S. Morser, et al., filed December 5, 1958 and assigned to the assignee of this application. However, any suitable system adapted to establish suitable flow rates and pressures to maintain a fluid film separating the bearing surfaces and floating the shaft therein may be utilized.

The clearances between the bearing surfaces are extremely small and thus permit slow and generally uniform flow of fluids, such as oil, water, air or other liquids and gases, therethrough under high pressure from the ports 22. The clearance employed generally ranges between .001″ and .005″, depending upon various factors, such as the bearing load, the fluid viscosity, and the pressure employed. The flow is so controlled at opposite sides of the shaft and bearing members that the resulting pressure at the opposite pockets automatically maintains the shaft centered in the bearings.

The support member 16 is mounted upon a suitable stationary surface 26. However, in order to accommodate axial thermal growth of the shaft 10, or lateral distortion and deflection thereof, my invention contemplates the provision of third hydrostatic bearing means, generally designated 28, for supporting the member 15 for canting movement about an axis transverse to the shaft axis and laterally spaced therefrom. To this end, the member 15 is formed with an internal surface of revolution or bore 29, whose axis extends transversely to that of the shaft 10 and is spaced laterally therefrom. The axle 30 is disposed within the bore 29, and is formed with an external surface like the internal surface of the bore, but of slightly smaller diameter such that the external and internal surfaces are in minutely spaced relation to form a clearance therebetween. As is shown in FIG. 3, the supporting member 15 is formed with depending spaced leg portions 32 and 33, through each of which the axle 30 and bore 29 extend. Means for supporting the axle upon the surface 26 are provided, comprising a cradle member 34 secured to the supporting surface by any suitable means (not shown). The axle is received in an opening 35 in the cradle member with a snug fit so as to retain the axle in a fixed position therein.

The bearing 28 functions similarly to the bearings 12 and 13, and to this end, ports or passageways 36 are formed within the support member 15, and terminate in pocket recesses 37 spaced circumferentially about the bore 29 at 90 degree intervals in each of the legs 32 and 33. There are thus eight ports and pockets disposed in axially aligned pairs about the axle 30. Oil is forced through all these ports under controlled pressure and/or at a controlled flow rate to the bearing surfaces of the axle 30 and the bore 29, by the same circulating system (not shown) previously referred to in connection with the bearings 12 and 13.

The bearing support member 15 thus functions as a pivot hanger, which is supported for canting movement relative to the shaft 10 upon the hydrostatic bearing 28. The axial spacing between the cradle 34 and the leg portions 32 and 33 is preferably made sufficiently small (generally in the range .001″–.005″) so that oil escaping between these members maintains their spacing by hydrostatic action. In this manner, canting movement of the member 15 is supported completely hydrostatically, and without the friction of metal-to-metal contact.

By these means, the assembly accommodates thermal growth, lateral deflection, or misalignment of the shaft by self-aligning canting movement of the bearings 12 and 13 relative to the axis of the shaft 10. The improved bearing assembly incorporates hydrostatic bearings in both the shaft bearings and the pivot bearing, and exhibits greatly reduced frictional characteristics in its self-aligning action. The assembly is therefore particularly adapted for use in precision instruments, although its use is not limited thereto.

While I have shown and described a specific embodiment of my invention for purposes of illustration, it will be apparent to those skilled in the art that various changes and modifications may be made without departing from the spirit and scope of the invention. I therefore intend in the appended claims to cover all such changes and modifications.

What I claim and desire to secure by Letters Patent of the United States is:

1. A self-aligning shaft and bearing assembly comprising, in combination; a shaft, first and second hydrostatic bearings spaced along said shaft for axially restraining and rotatively supporting said shaft, each of said first and second bearings comprising a member secured to said shaft and a bearing support member, each of said support members having an internal surface of revolution in minutely spaced relation from a like external surface of revolution of said first mentioned member, a third hydrostatic bearing supporting said first bearing pivotally for canting movement about an axis transverse to the rotational axis of said shaft and laterally spaced therefrom, said third hydrostatic bearing comprising an axle having an external surface of revolution in minutely circumferentially-spaced relation from a like internal surface formed about said transverse axis in said bearing support member of said first bearing, and means for supplying a flow of fluid under pressure to said first and second bearings and to said internal surface of said third bearing.

2. A self-aligning shaft and bearing assembly comprising, in combination; a shaft, first and second ball and socket hydrostatic bearings spaced along said shaft and supporting said shaft for rotation therein, each of said ball and socket bearings comprising a ball member secured to said shaft and a bearing support member, each of said support members having an internal spherical surface in minutely spaced relation from a like external spherical surface of said ball member, a third hydrostatic bearing pivotally supporting a first one of said bearing support members for canting movement about an axis transverse to the rotational axis of said shaft and laterally spaced therefrom, said third hydrostatic bearing comprising an axle having an external surface of revolution in minutely spaced relation from a like internal surface formed about said transverse axis in said first one of said bearing support members, means for supporting said axle and the second of said bearing support members, and means for supplying a metered flow of fluid under pressure to the clearances between said spaced internal and external surfaces in each of said hydrostatic bearings to maintain the spaced-apart relation of said surfaces, respectively.

3. A self-aligning shaft and bearing assembly comprising, in combination; a shaft, ball and socket hydrostatic bearings spaced along said shaft and supporting said shaft for rotation and universal movement therein, each of said ball and socket bearings comprising a ball member secured to said shaft and a bearing support member, each of said support members having an internal spherical surface in minutely spaced relation from a like external spherical surface of said ball member, a first one of said support members further formed with a bore laterally spaced from and transverse to said shaft, said bore forming an internal surface of revolution, an axle forming an external surface of revolution of like form and minutely smaller diameter than said bore, said axle received in said bore in circumferentially spaced-apart relation thereto to form a further hydrostatic bearing, means for supporting said axle and the second of said bearing support members, and passageways formed in said support members in fluid communication with said internal spherical surfaces and said internal surface of revolution, respectively, for supplying a flow of fluid under pressure to the spaces between said surfaces of said hydrostatic bearings.

4. A self-aligning shaft and bearing assembly as recited in claim 3, said means for supporting said axle comprising a cradle member in which said shaft is mounted, said first support member formed with spaced-apart leg portions and said bore extending through said leg portions, said cradle member extending between said leg portions and said shaft extending from said cradle member into said bore in each of said leg portions.

References Cited in the file of this patent

UNITED STATES PATENTS

| | | |
|---|---|---|
| 1,546,968 | Chandler | July 21, 1925 |
| 2,851,879 | Wetherbee et al. | Sept. 16, 1958 |

FOREIGN PATENTS

| | | |
|---|---|---|
| 896,233 | France | Feb. 15, 1945 |
| 68,461 | France | Nov. 12, 1957 |